(12) United States Patent
Gerfast

(10) Patent No.: US 9,018,819 B2
(45) Date of Patent: Apr. 28, 2015

(54) BRUSHLESS, IRONLESS STATOR, SINGLE COIL MOTOR WITHOUT LAMINATIONS

(76) Inventor: Sten R. Gerfast, Mendota Heights, MN (US)

( * ) Notice: Subject to any disclaimer, the term of this patent is extended or adjusted under 35 U.S.C. 154(b) by 225 days.

(21) Appl. No.: 13/573,290

(22) Filed: Sep. 7, 2012

(65) Prior Publication Data

US 2014/0070651 A1    Mar. 13, 2014

(51) Int. Cl.
| H02K 3/04 | (2006.01) |
| H02K 21/14 | (2006.01) |
| H02K 21/22 | (2006.01) |
| H02K 3/47 | (2006.01) |
| H02K 16/02 | (2006.01) |

(52) U.S. Cl.
CPC ............... *H02K 21/14* (2013.01); *H02K 16/02* (2013.01); *H02K 21/22* (2013.01); *H02K 3/47* (2013.01)

(58) Field of Classification Search
USPC ................................. 310/179–180, 194, 208, 310/216.001–216.003, 265, 68 B, 68 D
See application file for complete search history.

(56) References Cited

U.S. PATENT DOCUMENTS

| 4,331,896 | A | * | 5/1982 | Sedgewick | 310/179 |
| 4,720,646 | A | * | 1/1988 | Torimoto | 310/71 |
| 4,883,981 | A | * | 11/1989 | Gerfast | 310/40 R |
| 5,508,571 | A | * | 4/1996 | Shafer, Jr. | 310/71 |
| 6,066,910 | A | * | 5/2000 | Scherrer | 310/268 |
| 6,700,275 | B2 | * | 3/2004 | Horng et al. | 310/179 |
| 6,912,773 | B2 | * | 7/2005 | Pullen et al. | 29/606 |
| 2004/0046474 | A1 | * | 3/2004 | Kalsi | 310/179 |
| 2007/0024146 | A1 | * | 2/2007 | Huang et al. | 310/180 |
| 2009/0152974 | A1 | * | 6/2009 | Li et al. | 310/179 |

* cited by examiner

*Primary Examiner* — Thanh Lam

(57) ABSTRACT

A brushless, single coil motor without laminations, with an alternate polarity permanent magnetic rotor and a stator having enhanced magnetic properties by soft iron parts backing up both rotor and stator.

The stator is having a plurality of wires grouped into packets, where the wires are connected continuously and terminating solely in two free stator lead ends, energized with pulses from a simple electronic circuit, to start and run the motor.

14 Claims, 3 Drawing Sheets

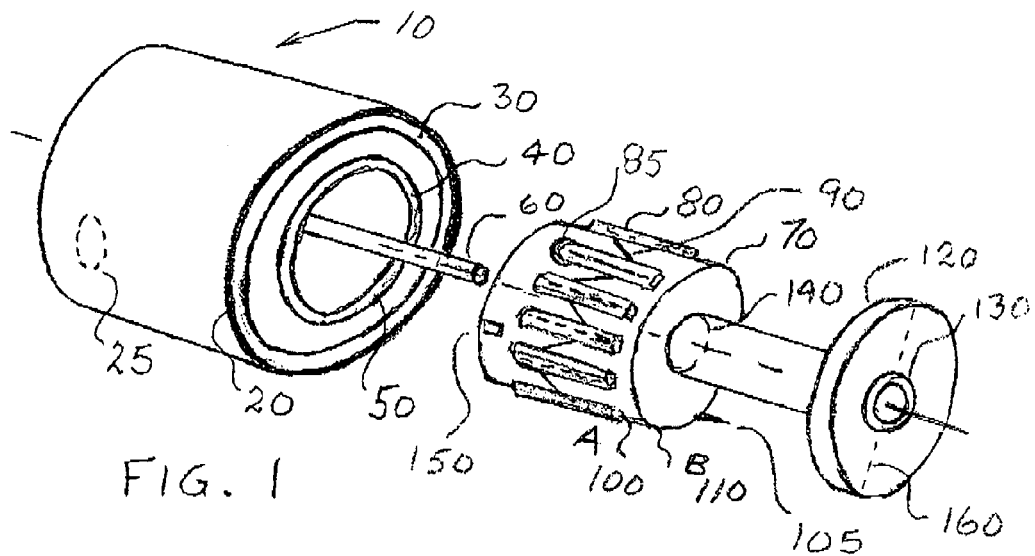
FIG. 1
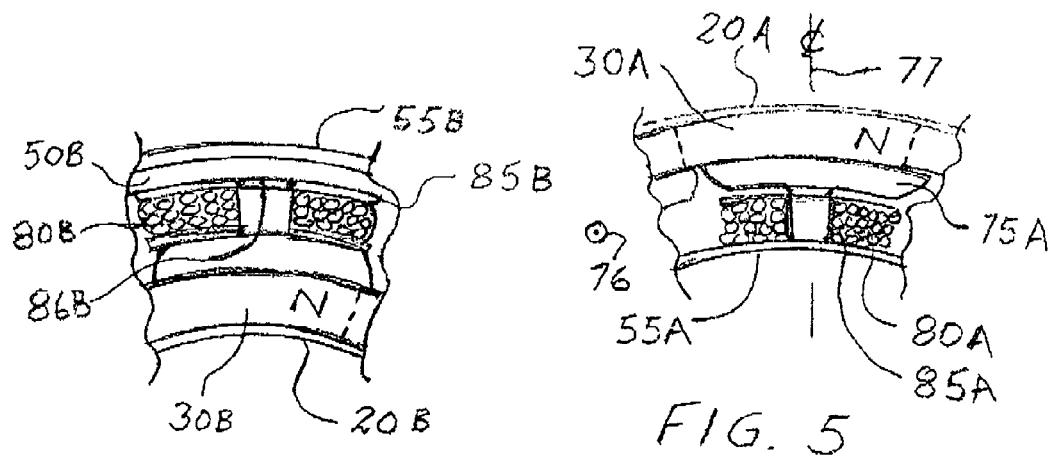
FIG. 6
FIG. 5

BRUSHLESS, IRONLESS STATOR, SINGLE COIL MOTOR WITHOUT LAMINATIONS

BRIEF DESCRIPTION

The bit-shiest, single coil motor without laminations described in this invention uses permanent magnetic field lines co-acting in unison, with magnetic field lines inherently emanating from current carrying packets of wires to both start and run the motor.

The meaning of Brushless is that the energizing of the motor is done without any brushes.

A single coil means that the stator coil has solely two free ends stator leads. Even though it has a plurality of stator coils that are backed-up by soft iron, this motor is unusual in that it has only two free ends coming from the stator. Without laminations in stator or rotor it becomes un-necessary to apply epoxy and varnish to the stator laminations, and heating afterwards, to set and dry these compounds.

The heating in prior art is done in two ovens using natural gas or other fuels. The present invention does not need to use any healing, nor any natural gas, and is therefore very environmentally friendly.

A plurality of wire grouped into packets, are paired by two packets electromagnetic field, having the same number as the motors permanent magnet fields, even though not all packet pairs might be assembled. The present permanent magnet motor does not have the energy loss deficiencies of prior art motors. It is unique by having equal number of stator and permanent magnets and also uniquely has solely 2 free ends stator leads from the stator, which also simplifies a drive circuit.

Background and Related art.

The present motor is Brushless, Single coil and has no laminations and is self-starting.

Related art single-phase AC (alternate current) electric motors running on regular AC current are not inherently self-starting when they are turned on, but need some form of starting function.

A common electric motor in use today is the "split phase motor", not self-starting without a start winding split from the main winding, with the start winding disconnected after running.

A "shaded pole" motor uses a separate short-circuited winding section to create a starting function, even though it has a very low start and run torque, it is in-expensive and is commonly used.

A "capacitor start motor" uses a separate capacitor to shift the phase angle of a winding to achieve starting.

A "permanent split capacitor motor" (PFC) again uses a separate capacitor to shift the phase angle of a winding to achieve starting, with the capacitor permanently left in the circuit.

Brush type motors such as the "DC motor" or the "Universal motor" both use a "commutator" and two or more "brushes" to achieve starting and running.

"Reluctance motors" need an electronic circuit to start and run.

"Brushless permanent magnet motors" need an electronic circuit, normally with 6 transistor's, to convert the single phase current to 3-phase current, after which the converted 3-phase current starts and runs the motor. If the "brushless permanent magnet type" drive motor is of the 3-phase type, the number of rotor poles are different then their stator poles which means that not all of the rotor poles are lining up with their stator poles, at any one time, which also results in a loss of efficiency.

Common pairings of stator poles vs. rotor poles are 6-8, 12-8, 6-4 and 6-2.

With the un-equal number of stator Doles vs. rotor poles, especially if the rotor construction is of the permanent magnet type, it will also mean that all the magnetic flux from the permanent magnets, wilt never totally co-act with all the stator poles, at any one time, which results in a loss of efficiency.

Other motors driven from the AC power line have speed profiles that must be related to the frequency of the power line. If the frequency is 60 hertz, a 2-pole motor runs at about 3450 RPM, a 4-pole motor about 1650 RPM, a 6-pole motor at about 1100 RPM and so on.

The above stated starting devices that are presently used are costly and some are complex.

A simple starting system for permanent magnet motors would be desirable.

PRESENT INVENTION

The present permanent motor invention does not have the above deficiencies, it has equal number of stator packet pairs and permanent magnet fields, and has solely 2 free ends stator leads.

These two free ends are driven by a simple drive circuit guided by a rotor position sensor which indicates where the rotor is stopped, signaling to the drive circuit to start the motor.

The same rotor position sensor is also providing correct signals during the running of the motor.

In regards to the frequency limitation, the present invention does not have any limitation.

It can be driven by the simple pulsed drive circuit at any speed.

The motor described in this invention is brushless, single coil and has no laminations.

The meaning of Brushless is that the energizing of the motor is done without any brushes, but also generally means that the energizing is done with pulses from an electronic circuit A single coil means that the stator coil has solely two free ends stator leads, energized by pulses.

Without laminations indicates that neither the stator nor the rotor has any laminations.

The motor uses permanent magnetic field lines in the rotor co-acting with magnetic field lines inherently emanating from current carrying wire packets in the ironless stator, to both start and run the motor.

It has equal number of stator windings or packets pairs and permanent magnet fields, with both having soft iron parts backing which enhances the magnetic properties, and has solely 2 free ends stator leads from the stator. Each of the permanent magnets is always assembled into its plurality of specified number of poles on the rotor, with each of the magnets regarded as a separate permanent magnet field, co-acting with the same number of stator packet pairs.

For each said permanent magnet field, a plurality of wires are grouped into packets.

Many pairs of electro-magnetic packets pairs are generally assembled into its stator assembly, even though the motor might not have all the corresponding packet pairs totally assembled, with some spaces for the packet pairs left empty. The remaining packet pairs always are connected continuously and terminating solely in two free stator lead ends.

The advantage of partial assembly is three-fold:

The motor manufacturer can assemble motors of different torques on the same frame, different speeds on the same frame and saving both in material and assembly.

Secondly, it can give the motor customers their required speed characteristics without building a more powerful motor and then limit its speed with PWM (pulse width modulation). It also reduces the weight of the magnet wire, again with a reduced material cost and reduced assembly cost.

As an example, a sixteen magnet rotor can have only a few single wire packet pair on its stator, but the 16 magnet rotor would still receive 16 power pulses from the single "packet pair's" two free stator ends, energized from the normal drive circuit, (and its synchronized drive current pulses) according to commands from the rotor position sensor witch senses 16 magnet poles. Because of the present inventions unique construction this combination is possible, with the possibility of having other numbers Such as 16-4, 16-5 16-6 . . . 16-16, or more poles.

The added number of power pulses, within its limits, is a benefit as stated in common motor formulae:

"Torque=poles×flux×turns×volts/resistance"

The number of poles is recognized as a power enhancer, gives added power pulses and greater torque even with other motor parameters being equal.

The present invention can have any number of power pulses depending on its construction.

Of course, the number of packets could be divided into separate sections for multiple speed control.

Another benefit would be that the number of wire packets could be suited for achieving the total higher stator resistance and inductance, an important factor when 230 or 277-volt operation is called for, without having to wind with a very small magnet wire diameter or gauge.

The soft iron backing that is enhanced flux lines and magnetic fields also enhances the torque created in all the stator's wire packets according to Faraday's induction law:

"When an electric current flows across the lines of force of a magnetic field an electromotive force is observed which is at right angle to both the primary current and the magnetic field."

Soft iron parts that will enhance flux fields and torque effects is also used as start and run power in this invention. The spacing between the rotor magnet's and the spacing of the packet from the magnets, for best torque efficiency, can be calculated using the square law of magnetic fields which states:

"Reduction of North-South magnet spacing in half quadruples the magnetic flux".

This calculation can also include the optimum air gap between magnets, soft parts and packets.

The wire winding of the packet's can be wound directly on a winding drum, or frame, or can be pre-wound on "bobbins" and later assembled onto a mounting drum or frame, with the bobbin method, with soft iron parts inside the bobbins, being the preferred method for pre-winding.

The packet pairs can have more then one embodiments as shown FIG. 3. Referring to this Figure which is showing the stator drum with the packets arranged in a different embodiment.

From a starting point the packet goes to the left then up, then right, then up, left, then up . . . and so on.

The packet arrangement shown in FIG. 1 is: from a starting point the packet goes to the left then up, then right, then down, then left . . . and repeat. A formed soft iron part 75 with a convex radius is also shown in FIG. 5. The part 75 could have a stabilizing tab on the right side and on the left side, reaching the adjacent similar part 75 for stability, or it could have a tab on one side and a congruent notch on the other side to stabilize.

FIGS. 1, 2, 5 and 6 are showing bobbins for pre-winding.

The many packet pairs with its 2 free stator ends, hereafter called A and B, are normally pulsed with a current pulse that moves the rotor and its magnets to a new position.

If the current pulses are making the A end positive and B end negative, the rotor responds by assuming a new position, or start position if the rotor is stationary, which is sensed by a rotor position sensor, that signals the simple drive circuit, to reverse the current, making A negative and B positive. The rotor responds accordingly with another advancement of the rotor to achieve both start function and run function, with the possibility of the rotor running at multi-thousand RPM (rotation per minute).

If the number of packet pairs and magnet fields are great enough, the motor of this invention can be made to run directly on alternating current (AC) without a pulsed drive circuit Common frequencies of AC are: low frequency, 50 Hertz, 60 Hertz and 400 Hertz.

The start frequency which would make this motor start and run directly on AC can be calculated from:

"Number of poles, Hertz, rotor and load inertia, rotor diameter, magnetic flux field, ampere-turns and bearing quality."

In addition, it is a known fact that the flux lines emanating from a magnet's front face are greater if the magnet's back face is mounted on a soft iron or multiple steel plates.

This also true with a soft iron back face on wire windings. The present invention is utilizing this fact by mounting the rotor's magnet's on a soft iron cylinders. Soft iron parts number 20 and 40 would enhance both magnets and coils in the packet pairs. After that the drum 70 is assembled oversoft iron part 40, it then become the back face for the drums wire windings. Because of the soft iron part 40, the wire windings, wound on the bobbins, have enhanced magnetic properties.

Similarly, because of the soft iron part 20 the magnets have enhanced magnetic properties FIG. 5 is showing a pocket pair 80A wound on a bobbin and having a formed soft iron part 75A connected with soft iron part 55A. A magnet assembly 30A is in close relationship to part 75A, which is the outside ring 20 A with magnets 30A. This design is what is called an outside-in motor.

Part 75A has a convex radius. A needle 76 approximately on the centerline 77 can wind the wire windings on the bobbin or on a drum.

FIG. 6 is showing a variant of the invention normally called an internal rotor type.

It is showing a pocket pair 80 B wound on a bobbin 85B and having a formed soft iron part 75 B connected with soft iron part 78B A magnet assembly 30B is in close relationship to part 75B.

It is a soft iron t-shaped part with a concave radius. The simple drive circuit and its circuit board is shown in FIG. 4. It is showing its simple drive circuit with 4 transistors, connection to the rotor position sensor, and two power leads. The two free ends stator leads are connected in between the 4 transistors, and the rotor position sensor is signaling to the transistors when to turn on specific transistors.

This new motor design, which eliminates iron laminations, which are used in the majority of electric motors today, is therefore less costly and uses less materials.

Another saving is that the necessary prior art insulation of laminations by epoxy coatings or insulating plastic tabs on the prior art laminations are not now required.

For the epoxy coatings to adhere to the lamination a heated oven is required, which is using natural gas or other fuels. In addition prior art lamination stators, with windings, require varnish coatings again going through another oven heated with gas.

This invention does not use natural gas for its manufacture, and is therefore both environmentally friendly and less expensive.

These laminations are replaced by soft iron parts, by bobbins or insulating sleeves.

When a related art motor is using laminations in a permanent magnet motor a resulting interaction causes torque pulsations, also known as "cogging".

The present invention has no laminations and less cogging.

It is of simple construction, yet is as efficient or more efficient then the above listed motors.

It's unique design is distinguished by:
Multi-pole stator, yet a stator with only two free lead ends; specifically in claim 1, claim 2, claim 6.
Same number of magnets and coils; specifically in claim 1, claim 2, claim 5. Claim 6.
Simple drive circuit with only 4 transistors. specifically shown in FIG. 7.

The above summary is not intended to describe each disclosed embodiment or every implementation of the present invention. Figures and the detailed description, described herein, is not intended to limit other embodiments.

BRIEF DESCRIPTION OF THE DRAWING

FIG. 1 is showing the simplicity of construction in an exploded view, a rotor with magnets, the rotor shaft, stator with assembled packets with its two free ends, and a motor frame with journal bearings.

The above summary is not intended to describe each disclosed embodiment or every implementation of the present invention. Figures and the detailed description, described herein, is not intended to limit other embodiments.

Figure 2:
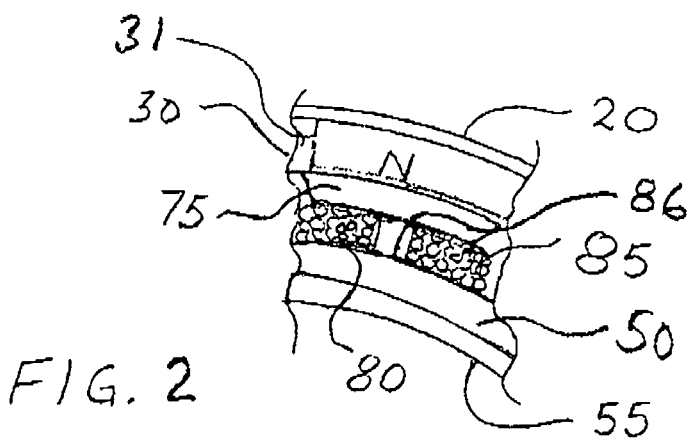

FIG. 2 is showing magnetic field interaction between packet pairs in the stationary stator and the permanent magnets.

Figure 3:
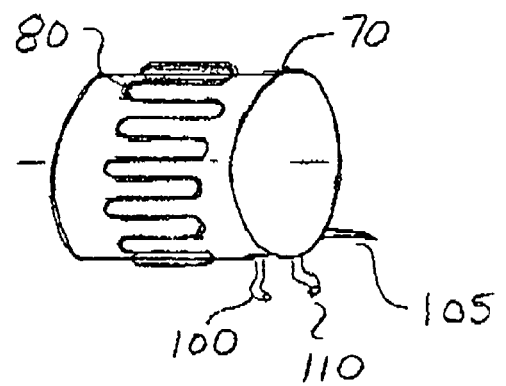

FIG. 3 is a description of how the packets are wound with an alternate embodiment on the stator packet construction, yet giving similar performance as the stator shown in FIG. 1 and also showing the packets two free ends.

Figure 4:
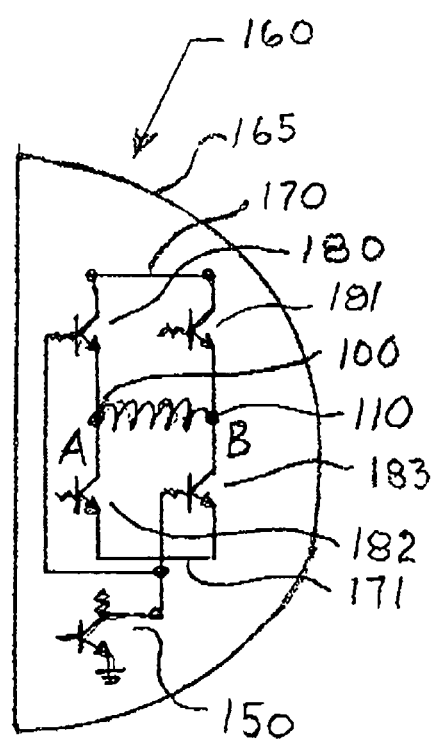

FIG. 4 is showing the simple drive circuit and the rotor position sensor.

FIG. 5 is showing a packet pair being wound on the stator drum using a bobbin and a soft iron guide for guiding the wire onto the bobbin and the circular motion of a wire carrying needle.

It has a construction were the rotor is on the outside and the stator assembly is on the inside.

FIG. 6 is showing an alternate magnet embodiment with a soft iron part and packets. It has a construction were the rotor is on the inside and the stator assembly is on the outside.

DETAILED DESCRIPTION OF THE DRAWING

FIG. 1 is an exploded view of the ironless stator, brushless motor assembly 10 with a soft iron cylinder 20 having an attached magnet ring 30 which are magnetized with a plurality of alternate polarity magnet poles.

The magnet poles can also be attached to the cylinder 20 as a number of magnet segments.

The axial cylinder 20 is mounted on a shaft 60.

A cylindrical stator mounting drum 70 is showing a plurality of packet pairs 80 that are all interconnected with connections 90 between the pairs and are terminating solely in two free stator lead ends 100 and 110. The lead ends are also marked "A' and "B".

The mounting drum 70 is assembled by sliding it over the cylinder 40

A representative bobbin 85 is shown on one of the packets.

A plurality of mounting pins 105 on the stator drum is securing the stator drum onto the drive circuit 160. One representative such pin is shown at 105. These pins also could also provide electrical connections from the stator drum 70 to the drive circuit 160.

The axial cylinder 20 has openings to provide air ventilation on the inside of the motor.

One representative such opening is shown at 25.

A rotor position sensor 150 is located on the stator and a drive circuit 160 is on a motor frame 120, The motor frame 120 has bearings 130 and 140 for the central shaft 60.

FIG. 2 is showing one of the plurality of packets pairs 80.

The spaces between the packet pairs can be left empty or be filled with a bobbin 85 or a spacer.

The soft iron cylinder 20 is shown with attached magnet 30. The flux change between magnets is shown through-out in the figures, with dashed lines 31, as an indication were the magnet rings changes polarity.

The magnet assemblies could also use separate magnet segments instead of magnet rings.

The bobbin 85 could be replaced with an insulating thin section spacer.

The soft iron 20 is aiding the magnets 30 to achieve their best performance.

This aiding or enhancement of the flux lines continues throughout the periphery of the motor in its plurality of magnet pairs and packet pairs as explained in the description.

A magnet flux field change is indicated at 31 causing the rotor position sensor 150 to signal to the drive circuit 160 to change pulses from positive to negative. 150 and 160 are shown in FIG. 1.

The point 31 is a neutral point. The preferred change over point by the sensor is at 7 degrees earlier, for best efficiency, with angular tolerances in both directions.

The angular change over point can be accomplished by adjusting the rotor position sensor mechanically, or, adjusted by electronic means.

It is also showing an additional soft iron cylinder 55 has been added to the soft iron part 50.

The packet pair 80 is having a formed t-shaped soft iron parts 75 inside the bobbin 85, The t-shaped soft iron parts 75 can be attached to part 50 at 86.

The center of packet pair 80 can be left empty or can be using a bobbin 85 for winding purposes.

A soft iron ring 20 is providing back-up iron for the magnets.

FIG. 3 is showing the stator drum 70 were the packets 80 are wound with an alternate embodiment on the stator packet construction, yet giving similar performance as the stator shown in FIG. 1.

It is also showing the packets two five ends 100, 110 and a pin 105 that are also shown FIG. 1.

The alternate embodiment could be described as: from a starting point the packet goes to the left then up, then left, then down, left, then up . . . and so on.

The packets two free ends 100 and 110. are connected, as previously described, to a circuit.

Contrary in FIG. 1 is shown a stator drum 70, the winding of a pocket pair 80 could be described as: from a starting point the packet goes to the left then up, then right, then down, then left, and repeat, to obtain a packet pair, which is then interconnected with the next pair using interconnects 90 wherein the current in the wire packets, is co-acting toroidal-like at all times in unison.

FIG. 4 is showing the simple drive circuit 160 having a semi-circular outline 165.

It has a first power connection 170, and a second power connection 171.

It is showing four transistors 180, 181, 182 and 183 with the single coils two ends 100 and 110, with designation A and B, connected at the center point of the four transistors.

The rotor position sensor 150 is shown connected to transistors 180 and 183 which makes the current go from power 170 to point A through the coil to point to B and down to power 171 which rotates the rotor. This rotor rotation is sensed by sensor 150, that switches on transistors 181 and 182 and thereby connects power 170 to 181 and 182 through the coil in the alternate direction, B through the coil to point to A that again rotates the rotor, and so on.

The above sequence assures both the start and the run of this motor.

FIG. 5 is showing a packet pair 80A around a curved cross section soft iron part 75A and also showing how the curvature of 75A fits in close relationship with magnet 30A.

The packet pair 80A can be wound directly or using a bobbin 85A.

To aid in a uniform cross section of the packet during the winding, the formed part 75A can be guiding the wound wires to have a uniform inside and outside diameter of the packets.

Pressure or heat can be applied to part 75A or to bobbin 85A for uniformity.

A needle 76 that carries the wound wires during the winding of a packet pair 80A, if wound directly onto the stator drum is also indicated as rotating in a uniform circle at the approximate centerline 77 of the packets. As previously mentioned the part 75A, also on the centerline, is used as a guide for a more centered winding of the packet pair 80A.

A soft iron part 55A is providing magnetic enhancement for the pocket pair 80A.

A soft iron part 20A is providing magnetic enhancement for the magnet 30 A.

This design is what is called an outside-in motor. Part 75A has a convex radius.

FIG. 6 is showing a variant of the invention normally called an internal rotor type.

It has an alternate magnet embodiment and packet pair 808. It has a construction were the magnets 30 B is on the inside and the stator drum 55 B is on the outside.

It is showing a pocket pair 80 B wound on a bobbin 85B and having a formed soft iron part 75 B connected with soft iron part 78B A magnet assembly 30B is in close relationship to part 75B, a soft iron t-shaped part with a concave radius. A bobbin 85B which could simplify the winding is also shown.

The above summary is not intended to describe each disclosed embodiment or every implementation of the present invention. Figures and the detailed description, described herein, is not intended to limit other embodiments.

The invention claimed is:

1. A brushless, single coil motor without laminations comprising:
    a brushless stator single coil motor without laminations,
    having a rotor mounted on a common shaft journalled w bearings on a motor frame,
    the rotor having a plurality of alternate polarity permanent magnets,
    a stator having a plurality of wires grouped into packets, with the stator having a plurality of adjacent wire packets pairs,
    with rotor and stator having soft iron back-up,
    with the permanent magnet and wire packets electro-magnetic fields having equal numbers,
    were wire packets are connected continuously and terminating solely in two free stator lead ends,
    connected to a drive circuit which is synchronizing alternating current pulses into all the wire packets at timing commands from a rotor position sensor, wherein the electro-magnetic field, is co-acting with the permanent magnetic field to start and run the motor.

2. A brushless, single coil motor without laminations comprising:
    a brushless single coil motor having a rotor
    mounted on a common shaft journalled in bearings on a motor frame,
    a soft iron cylinder mounted with permanent magnets,
    a non-rotating stator drum having a plurality of wires
    grouped into packets with the stator having a plurality of adjacent wire packets pairs,
    with a limited number of packet pairs assembled into said motor,
    with the wire packets pairs having a curved cross section with soft iron back-up,
    were the wire packets that are assembled, and are connected continuously and terminating in two free stator lead ends,
    connected to a drive circuit which is synchronizing alternating current pulses into the wire packets at timing commands from a rotor position sensor, wherein the current in the wire packets, is co-acting at all times in unison with the permanent magnetic field to start and run the motor.

3. The motor assembly of claim 2 wherein each packets formed on each side of a central bobbin, or central opening having a soft iron part,
    that becomes one stator packet group, and the number of said groups and the number of permanent magnet poles is having exactly the same number,
    said groups and poles energized by alternating pulses to produce motor torque.

4. The motor assembly of claim 1 wherein the rotor, with mounted magnets, is driven mechanically causing a current to be induced in the total number of packets assembled, with a generator current output occurring in the two free stator lead ends.

5. The motor assembly of claim 2 wherein the rotor cylinder have openings to provide air ventilation on the inside of the motor.

6. The motor assembly of claim 2 wherein mounting pins on the stator drum is securing the drum onto the drive circuit and the pins also provide electrical connections from the stator drum to the drive circuit.

7. The motor assembly of claim 1 wherein the packet pair with its curved cross section and a soft iron formed part, fitting the stator drum, is wound directly on the drum, or is wound separately and then mounted on the drum.

8. The motor assembly of claim 7 wherein said winding is using a plurality of formed soft iron parts or bobbins for guiding the wound wires onto the packet for a uniform inside and outside diameter of the packets, and further apply pressure or heat to said parts or bobbins to achieve said uniformity, and a needle moving in concentric circles at the centerline of the packets to further do wire guidance.

9. The motor assembly of claim 1 wherein the stator drum is made out of plastic, thermo-set plastic, phenolics or metal with an insulating coating.

10. The motor assembly of claim 2 wherein the placement of the rotor and stator is reversed with the stator being on the outside and on the inside of the motor a rotor having formed parts with a concave radius.

11. The motor assembly of claim 1 wherein the motor is made to start and run on common AC only, with a plurality of coils, and by minimizing rotor diameter, rotor and load inertia and having good bearing quality.

12. The motor assembly of claim 2 wherein each said plurality of permanent magnet fields normally having spaces for the same plurality packet pairs, is having a number of said spaces left empty of packet pairs, with the remaining packet pairs receiving power pulses through the pairs two ends.

13. The motor assembly of claim 1 wherein said wire grouping is using a wire carrying needle, which is solely rotating in a circular motion, laying down wires formed into packets on a drum-shaped stator form with the aid of the guides and a bobbin.

14. The motor assembly of claim 1 wherein the rotor position sensor is angle-adjusted mechanically or adjusted by an electronic circuit to maximize the motors efficiency.

* * * * *